US012746665B2

(12) United States Patent
Park

(10) Patent No.: US 12,746,665 B2
(45) Date of Patent: Sep. 29, 2026

(54) ROBOT CONTROL APPARATUS AND METHOD THEREOF

(71) Applicants: Hyundai Motor Company, Seoul (KR); Kia Corporation, Seoul (KR)

(72) Inventor: Gi Yong Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

(21) Appl. No.: 18/956,618

(22) Filed: Nov. 22, 2024

(65) Prior Publication Data

US 2026/0027708 A1 Jan. 29, 2026

(30) Foreign Application Priority Data

Jul. 25, 2024 (KR) ........................ 10-2024-0098845

(51) Int. Cl.
*B25J 9/16* (2006.01)

(52) U.S. Cl.
CPC .................................. *B25J 9/1653* (2013.01)

(58) Field of Classification Search
CPC ...... B25J 9/1653; B25J 9/1602; B25J 9/1628; B25J 9/163; B25J 9/1656; B25J 9/1661; G05B 19/045; G05B 2219/23287; G05B 2219/23126; G05B 2219/35211
See application file for complete search history.

(56) References Cited

U.S. PATENT DOCUMENTS 7,272,587 B1 * 9/2007 Przytula ................... G06N 7/01 706/52
9,411,335 B2 8/2016 Kim et al.
2011/0035087 A1 2/2011 Kim et al.
2013/0066467 A1 3/2013 Song et al.
2019/0086894 A1 3/2019 Tenorth
2023/0234221 A1 7/2023 Ryu et al.
2024/0217097 A1 * 7/2024 Kelch .................... B25J 9/1602

FOREIGN PATENT DOCUMENTS

EP 4647920 A1 * 11/2025 ......... G05B 23/0256
JP 2017148830 A 8/2017
KR 20110015833 A 2/2011
KR 101119030 B1 3/2012
KR 101858108 B1 5/2018
KR 20230094006 A 6/2023
KR 20230111061 A 7/2023
WO 2017148830 A1 9/2017

OTHER PUBLICATIONS

Sebastian Castro "Introduction to behavior trees", Aug. 17, 2021, Robohub, https://robohub.org/introduction-to-behavior-trees/ (Year: 2021).*

* cited by examiner

*Primary Examiner* — Esvinder Singh
(74) *Attorney, Agent, or Firm* — Slater Matsil, LLP

(57) ABSTRACT

A robot control apparatus can include a memory storing computer-executable instructions and at least one processor that accesses the memory and executes the instructions. The at least one processor can obtain a standard behavior tree satisfying a target format, from a behavior tree, based on a behavior tree abstraction model applied to interpretation of the behavior tree, store a robot scenario paired with the standard behavior tree in the memory, and verify validation of the standard behavior tree, based on nodes included in the standard behavior tree and an edge between the nodes included in the standard behavior tree.

20 Claims, 9 Drawing Sheets

500

| ROBOT SCENARIO | BEHAVIOR TREE NAME | UNIT FUNCTION NODE LIST |
|---|---|---|
| Patrol Robot Scenario | | |
| | - Patrol 1 | - Node 1, Node2, Ndoe3 |
| | - Patrol 2 | - Node 1, Node4, Ndoe5 |
| | ... | |
| Hotel Robot Scenario | | |
| | - Hotel 1 | - Node 1, Node 10, Node 13 |
| | ... | |
| Common Scenario | | |
| | - Common 1 | - Node1, Node 20, Node 27 |

FIG. 5

ROBOT CONTROL APPARATUS AND METHOD THEREOF

CROSS-REFERENCE TO RELATED APPLICATIONS

This application claims the benefit of priority to Korean Patent Application No. 10-2024-0098845, filed in the Korean Intellectual Property Office on Jul. 25, 2024, the entire contents of which are incorporated herein by reference.

TECHNICAL FIELD

The present disclosure relates to a robot control apparatus and a method thereof.

BACKGROUND

Representing contents that should be performed from start to finish, when a robot wants to perform any task, is referred to as a behavior scenario of the robot. The behavior scenario of the robot may be represented by use of several methodologies, such as finite state machines (FSM), hierarchical finite state machines (HFSM), and behavior tree (BT).

As service robotics development companies gradually increase, the robotics development companies develop robot behavior scenarios using their own methodologies. At this time, one of the most common methodologies for designing the behavior scenario of the robot is a behavior tree. The behavior tree can be a method for dividing and representing a detailed behavior unit as the concept of node and connecting the nodes, which can be the detailed behavior unit, in an order in which they can be or should be performed, to represent the behavior scenario in a tree structure.

In implementing the behavior tree, the robotics development companies use a development language for each development company and a library suitable for a development environment and a development purpose. At this time, when the robotics development companies want to define a robot behavior tree using different libraries, because there is no standardized robot behavior tree representation method, they use a method for mainly using a Javascript Object Notation (JSON) or Extensible Markup Language (XML) data format to represent a behavior tree in a unique format of each development company.

Therefore, a data structure may be differently represented according to whether to use any data format, such as JSON or XML, or whether to define any component in a specific data format, in representing the behavior tree. JSON or XML is a data format of the standard specification. However, in representing the behavior tree, the robotics development companies configure the internal structure of JSON or XML as a unique format of each development company. Therefore, as a standardized interpreter is unable to be present and even the same behavior tree is represented in various data formats, reusability, compatibility, and development efficiency are lowered.

To address such a problem, there is a need to develop a method and a technology for representing a behavior tree in a specific format.

SUMMARY

The present disclosure relates to a robot control apparatus and a method thereof, and more particularly, relates to technologies for standardization of a behavior tree.

An embodiment of the present disclosure can solve the above-mentioned problems occurring in the prior art while advantages achieved by the prior art are maintained intact.

An embodiment of the present disclosure can provide a robot control apparatus for transforming and/or obtaining an identified behavior tree into a standard behavior tree to control a robot to provide a robotics developer or a user with improvement of development efficiency and a method thereof.

An embodiment of the present disclosure can provide a robot control apparatus for transforming and/or obtaining an identified behavior tree into a standard behavior tree to control a robot to improve reusability and compatibility of the behavior tree and a method thereof.

Technical problems to be solved by an embodiment of the present disclosure are not necessarily limited to the aforementioned problems, and solutions to other technical problems not mentioned herein by an embodiment of the present disclosure can be clearly understood from the following description by those skilled in the art to which the present disclosure pertains.

According to an embodiment of the present disclosure, a robot control apparatus may include a memory storing computer-executable instructions and at least one processor that accesses the memory and executes the instructions. The at least one processor may obtain a standard behavior tree satisfying a target format, from a behavior tree, based on a behavior tree abstraction model applied to interpretation of the behavior tree, may store a robot scenario paired with the standard behavior tree and the standard behavior tree in the memory, and may verify validation of the standard behavior tree, based on nodes included in the standard behavior tree and an edge between the nodes included in the standard behavior tree.

In an embodiment, the at least one processor may obtain a first parameter about a type of each of the nodes included in the behavior tree and a second parameter included in the first parameter and about an attribute of each of the nodes included in the behavior tree, from the behavior tree abstraction model, and may apply the first parameter and the second parameter to the behavior tree to obtain the standard behavior tree.

In an embodiment, the at least one processor may identify a root node included in the behavior tree, based on obtaining the first parameter and the second, may recursively search for the behavior tree on the basis of the root node to identify child nodes included in the behavior tree, may apply the first parameter to at least one target node among the child nodes included in the behavior tree to obtain a type of the target node, and may apply the second parameter to the target node to obtain an attribute of the target node.

In an embodiment, the at least one processor may combine the type of the target node and the attribute of the target node to generate a standard node, depending on the target format, and may connect the standard node with the root node to obtain the standard behavior tree.

In an embodiment, the at least one processor may identify a predetermined exception processing transformation model, based on not obtaining the type of the target node or not obtaining the attribute of the target node, and may obtain the type of the target node or the attribute of the target node, by use of the exception processing transformation model.

In an embodiment, the at least one processor may load the standard behavior tree stored in the memory, may display the nodes included in the loaded standard behavior tree and the edge between the nodes included in the loaded standard behavior tree as a plurality of icons on an interface which can be the basis of an operation in which a user edits the standard behavior tree, and may change the standard behavior tree, based on receiving an input to a first icon about the node and a second icon about the edge among the plurality of icons.

In an embodiment, the at least one processor may obtain the behavior tree from the standard behavior tree, based on the behavior tree abstraction model.

In an embodiment, the at least one processor may apply the behavior tree to a robot for performing the robot scenario to control the robot, based on that the validation of the standard behavior tree is verified.

In an embodiment, the at least one processor may identify a first node being a root node among the nodes included in the standard behavior tree, may identify second nodes being child nodes among at least one node connected with the first node, may verify validation of the first node, based on a type of the first node and the number of the second nodes, and may recursively search for the standard behavior tree on the basis of the first node to verify validation of each of the nodes included in the standard behavior tree.

According to an embodiment of the present disclosure, a robot control method may include obtaining a standard behavior tree satisfying a target format, from a behavior tree, based on a behavior tree abstraction model applied to interpretation of the behavior tree, storing a robot scenario paired with the standard behavior tree and the standard behavior tree in a memory, and verifying validation of the standard behavior tree, based on nodes included in the standard behavior tree and an edge between the nodes included in the standard behavior tree.

In an embodiment, the obtaining of the standard behavior tree may include obtaining a first parameter about a type of each of the nodes included in the behavior tree and a second parameter included in the first parameter and about an attribute of each of the nodes included in the behavior tree, from the behavior tree abstraction model, and applying the first parameter and the second parameter to the behavior tree to obtain the standard behavior tree.

In an embodiment, the obtaining of the standard behavior tree may include identifying a root node included in the behavior tree, based on obtaining the first parameter and the second, recursively searching for the behavior tree on the basis of the root node to identify child nodes included in the behavior tree, applying the first parameter to at least one target node among the child nodes included in the behavior tree to obtain a type of the target node, and applying the second parameter to the target node to obtain an attribute of the target node.

In an embodiment, the obtaining of the standard behavior tree may include combining the type of the target node and the attribute of the target node to generate a standard node, depending on the target format, and connecting the standard node with the root node to obtain the standard behavior tree.

In an embodiment, the obtaining of the standard behavior tree may include identifying a predetermined exception processing transformation model, based on not obtaining the type of the target node or not obtaining the attribute of the target node, and obtaining the type of the target node or the attribute of the target node, by use of the exception processing transformation model.

In an embodiment, the storing of the standard behavior tree in the memory may include loading the standard behavior tree stored in the memory, displaying the nodes included in the loaded standard behavior tree and the edge between the nodes included in the loaded standard behavior tree as a plurality of icons on an interface which can be the basis of an operation in which a user edits the standard behavior tree, and changing the standard behavior tree, based on receiving an input to a first icon about the node and a second icon about the edge among the plurality of icons.

In an embodiment, the robot control method may further include obtaining the behavior tree from the standard behavior tree, based on the behavior tree abstraction model.

In an embodiment, the obtaining of the behavior tree may include applying the behavior tree to a robot for performing the robot scenario to control the robot, based on that the validation of the standard behavior tree is verified.

In an embodiment, the verifying of the validation of the standard behavior tree may include identifying a first node being a root node among the nodes included in the standard behavior tree, identifying second nodes being child nodes among at least one node connected with the first node, verifying validation of the first node, based on a type of the first node and the number of the second nodes, and recursively searching for the standard behavior tree on the basis of the first node to verify validation of each of the nodes included in the standard behavior tree.

BRIEF DESCRIPTION OF THE DRAWINGS

The above and other features and advantages of example embodiments of the present disclosure can be more apparent from the following detailed description taken in conjunction with the accompanying drawings, in which:

FIG. 5 is a drawing illustrating an example of a database stored in a memory, in a robot control apparatus according to an embodiment of the present disclosure;

Figure 1:
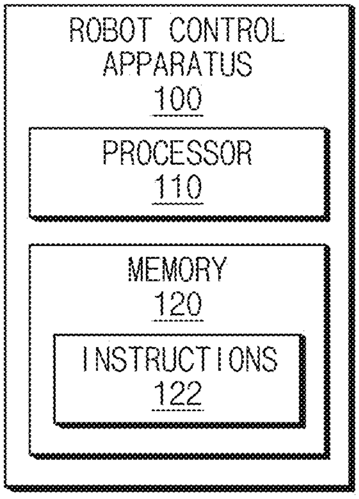
FIG. 1 is a drawing illustrating a block diagram of a robot control apparatus according to an embodiment of the present disclosure.

With regard to description of drawings, same or similar denotations may be used for same or similar components.

DETAILED DESCRIPTION OF ILLUSTRATIVE EMBODIMENTS

Hereinafter, some example embodiments of the present disclosure will be described in detail with reference to the drawings. In adding reference numerals to components of each drawing, it can be noted that identical components can be designated by identical numerals even when they are displayed on different drawings. A detailed description of well-known features or functions can be ruled out to not unnecessarily obscure the gist of the present disclosure. Particularly, various example embodiments of the present disclosure may be described with reference to the accompanying drawings. However, it can be understood that this is not intended to necessarily limit the present disclosure to specific implementation forms and can include various modifications, equivalents, and/or alternatives of example embodiments of the present disclosure. With regard to description of drawings, similar components may be marked by similar reference numerals.

In describing components of example embodiments of the present disclosure, the terms "first," "second," "A," "B," "(a)," "(b)," and the like, may be used herein. Such terms can be used merely to distinguish one component from another component, and do not necessarily limit the corresponding components irrespective of the order or priority of the corresponding components. Furthermore, unless otherwise defined, terms including technical and scientific terms used herein can have a same meaning as being generally understood by those skilled in the art to which the present disclosure pertains. Such terms as those defined in a generally used dictionary can be interpreted as having meanings equal to the contextual meanings in the relevant field of art, and are not to be interpreted as having ideal or excessively formal meanings unless clearly defined as having such in the present application. For example, terms, such as "first", "second", "1st", "2nd", or the like, can be used in the present disclosure to refer to various components regardless of the order and/or the priority and to distinguish one component from another component, and do not necessarily limit the components. For example, a first user device and a second user device can indicate different user devices, irrespective of the order and/or priority. For example, without departing scopes of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It can be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it can be understood that there is no intervening component (e.g., a third component).

According to the situation, the expression "configured to" used in the present disclosure may be used exchangeably with, for example, the expression "suitable for", "having the capacity to", "designed to", "adapted to", "made to", or "capable of".

The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device. Terms used in the present disclosure can be used to describe specified example embodiments and are not intended to necessarily limit the scope of another embodiment. Terms of a singular form may include plural forms unless the context clearly indicates otherwise. Terms used herein, which include technical or scientific terms, may have a same meaning that is generally understood by a person skilled in the art described in the present disclosure. Terms, which are defined in a dictionary and commonly used, can also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, example embodiments of the present disclosure will be described in detail with reference to FIGS. 1 to 9.

FIG. 1 is a drawing illustrating a block diagram of a robot control apparatus according to an embodiment of the present disclosure.

A robot control apparatus 100 according to an embodiment may include a processor 110 and a memory 120 including instructions 122.

The robot control apparatus 100 may indicate an apparatus for controlling a robot. For example, the robot control apparatus 100 may identify a behavior tree applied to the robot to control the robot. The robot control apparatus 100 may transform and/or obtain the identified behavior tree into a standard behavior tree satisfying a target format. Illustratively, the robot control apparatus 100 may transform and/or obtain the behavior tree into the standard behavior tree satisfying a target format (e.g., an XML format), based on that the behavior tree has a structure of a tree with a layer.

The robot control apparatus 100 may transform and/or obtain the behavior tree into the standard behavior tree and may store the standard behavior tree in a database or the memory 120. The robot control apparatus 100 may provide the standard behavior tree stored in the database or the memory 120 through a graphical user interface (GUI)-based interface to be edited by a user. When the user edits the standard behavior tree, the robot control apparatus 100 may verify validation of the edited standard behavior tree. Illustratively, the robot control apparatus 100 may verify the validation of the edited standard behavior tree, based on nodes included in the edited standard behavior tree and an edge between the nodes. However, the method for verifying the validation of the standard behavior tree in the robot control apparatus 100 is not limited thereto. For example, after transforming and/or obtaining the standard behavior tree from the behavior tree, the robot control apparatus 100 may verify validation of the transformed and/or obtained standard behavior tree. The verification of the validation of the transformed and/or obtained standard behavior tree may be the same as the method for verifying the validation of the edited standard behavior tree, which is described above.

The robot control apparatus 100 may transform and/or obtain the identified behavior tree into the standard behavior tree to control the robot, thus achieving the following effect. For example, the robot control apparatus 100 may provide a robotics developer or the user with improvement of development efficiency. Illustratively, the robotics developer or the user may freely exchange and correct a robot scenario or a behavior tree, which is developed dependent on a specific platform, between platforms and may reduce a time taken to develop the robot scenario or the behavior tree. The robot control apparatus 100 may improve reusability and compatibility of the behavior tree. Illustratively, the robot control apparatus 100 may increase the reusability of the robot scenario or the behavior tree, regardless of development environments of various robotics development companies, by use of the standard behavior tree satisfying the target format. The robot control apparatus 100 may improve code quality. Illustratively, the robot control apparatus 100 may obtain the standard behavior tree to provide a standardized code (e.g., a source code) and may provide the standardized code to improve quality of code management. The robot control apparatus 100 may provide the user with a GUI capable of editing the standard behavior tree, thus allowing the user as well as the developer of the behavior tree to participate in the development of the behavior tree capable of controlling the robot.

The processor 110 may execute software and may control at least one other component (e.g., a hardware or software component) connected with the processor 110. The processor 110 may perform a variety of data processing or calculation. For example, the processor 110 may store the behavior tree, the standard behavior tree, or the like in the memory 120.

For reference, the processor 110 may perform all operations performed by the robot control apparatus 100. Therefore, for convenience of description in the specification, the operation performed by the robot control apparatus 100 is mainly described as an operation performed by the processor 110. Furthermore, for convenience of description in the specification, the processor 110 is mainly described as, but not limited to, one processor. For example, the robot control apparatus 100 may include at least one processor. Each of or some combination of the at least one processor may perform all operations associated with the operation of transforming and/or obtaining the behavior tree into the standard behavior tree to control the robot.

The memory 120 may temporarily and/or permanently store various pieces of data and/or information required to perform the operation of transforming and/or obtaining the behavior tree into the standard behavior tree to control the robot. For example, the memory 120 may store the behavior tree, the standard behavior tree, or the like.

The robot control apparatus 100 may further include a communication device. For example, the communication device may assist in performing communication between the robot control apparatus 100 and an external server. For example, the communication device may include one or more components for performing communication between the robot control apparatus 100 and the external server. In detail, the communication device may include a short range wireless communication unit, a microphone, or the like. For example, a short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like.

Figure 2:
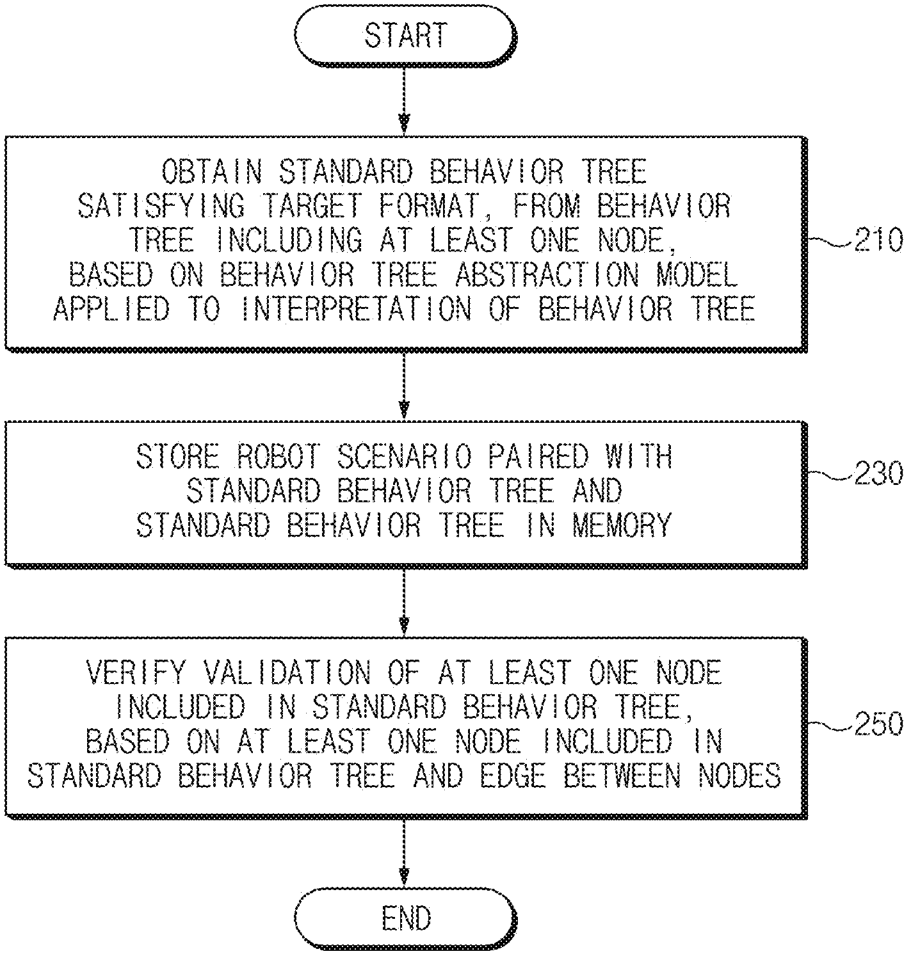
FIG. 2 is a flowchart for describing a robot control method according to an embodiment of the present disclosure.

FIG. 2 is a flowchart for describing a robot control method according to an embodiment of the present disclosure.

In operation 210, a processor (e.g., a processor 110 of FIG. 1) according to embodiment may obtain a standard behavior tree satisfying a target format, from a behavior tree, based on a behavior tree abstraction model applied to interpretation of the behavior tree.

The behavior tree may indicate a tree in which a method for changing tasks in an autonomous agent is structuralized. For example, the behavior tree may include a leaf node (i.e., an execution node) about execution of an internal node (i.e., a control flow node) about control flow. Furthermore, the behavior tree may include a plurality of nodes. The plurality of nodes may include the only node without parents and a child node with one parent node, which is a control flow node.

Illustratively, the control flow node may include a sequence node, a fallback node, a parallel node, or a decorator node. The execution node may include an action node and a condition node.

The sequence node may transmit a tick the left of the child nodes. When the child node delivers failure or running, the sequence node may deliver the failure or the running to the parent node. In other words, when the sequence node sequentially transmits the tick from the left of the child nodes and success occurs, the sequence node proceeds to a next child node. When returning failure or running, the sequence node does not transmit the tick to another child node any longer and transmits a value corresponding to it to its parent node.

The fallback node may transmit a tick from the left of the child nodes. When the child node delivers success or running, the fallback node may transmit the success or the running to the parent node. In other words, when the fallback node sequentially transmits the tick from the left of the child nodes and failure occurs, the fallback node proceeds to a next child node. When returning success or running, the fallback node does not transmit the tick to another child node any longer and transmits a value corresponding to it to its parent node.

The parallel node may transmit a tick to all the child nodes. The decorator node may be a control flow node that joins one child node. For example, the decorator node may add a specific rule to what the child node responds to. Illustratively, the decorator node may generate a control flow node, such as a condition for returning failure when the child node fails N times or a condition in which the child node returns success within T seconds.

The action node may execute a command. For example, the action node may be a node for performing a specific behavior, such as opening an automatic door, when moving or docking to a target point. The action node may transmit success when the command succeeds, may transmit failure when the command fails, and may transmit running when the command is running.

The condition node may check a current state and may transmit success or failure. The condition node may be used a method for checking a specific variable or a state of a robot.

The behavior tree abstraction model may be applied to interpretation of the behavior tree. For example, the behavior tree abstraction model may indicate a model for abstracting a behavior tree developed in various formats for each robotics development company as a standardized robot behavior scenario (e.g., a standard behavior tree). In detail, the behavior tree abstraction model may include metadata for interpreting a node constituting the behavior tree.

The metadata may include at least one of a parameter about a type of a node, a parameter about an element for each type of the node, or a parameter about a name of the node, or any combination thereof. For example, the metadata may include a first parameter about the type of the node and a second parameter about an attribute of the node. The second parameter may include a value for the type of the node and the name of the node. In detail, the processor may identify a type of each of the nodes included in the behavior tree, based on the first parameter included in the metadata. Thereafter, the processor may identify a value and a name of a node, a type of which is identified, based on the node, the type of which is identified, and the second parameter. The processor may generate a node newly written according to a target format, based on the type, the value, and the name of the node. The processor may connect the nodes newly written according to the target format, based on an edge relationship of the behavior tree, to obtain a standard behavior tree.

The target format may include at least one of a JavaScript Object Notation (JSON) format or an Extensible Markup Language (XML) format, or any combination thereof. For example, the target format may include formats predetermined by a robotics development company or a user. For convenience of description in the specification, the target format is described as the XML format, as an illustrative example. Particularly, a description will be given below of a detailed example about the behavior tree, the behavior tree abstraction model, and the standard behavior tree with reference to FIG. 4.

The processor may obtain the behavior tree from the standard behavior tree, based on the behavior tree abstraction model. For example, the processor may obtain the standard behavior tree from the behavior tree and may simultaneously obtain the behavior tree from the standard behavior tree, based on the behavior tree abstraction model. In other words, the operation of obtaining the standard behavior tree from the behavior tree may be described as a transformation operation. On the other hand, the operation of obtaining the behavior tree from the standard behavior tree may be described as an inverse transformation operation. The processor may obtain the behavior tree from the standard behavior tree, based on the first parameter and the second parameter.

When the user completes correction of the standard behavior tree by use of a GUI, the processor may obtain an inverse transformation behavior tree from the corrected standard behavior tree. For example, the processor may obtain the standard behavior tree from the behavior tree (i.e., a first behavior tree), based on the behavior tree abstraction model. The processor may obtain the corrected standard behavior tree from the standard behavior tree, in response to the correction of the user. Herein, the corrected standard behavior tree may indicate the standard behavior tree corrected by the user. The processor may obtain the inverse transformation behavior tree (i.e., a second behavior tree) from the corrected standard behavior tree, based on the behavior tree abstraction model. The processor may apply the inverse transformation behavior tree to a robot to control the robot.

In operation 230, the processor may store a robot scenario paired with the standard behavior tree and the standard behavior tree in a memory (e.g., a memory 120 of FIG. 1).

In operation 250, the processor may verify validation of the standard behavior tree, based on the nodes included in the standard behavior tree and an edge between the nodes included in the standard behavior tree. The processor may apply the behavior tree (i.e., the inverse transformation behavior tree) to the robot which performs the robot scenario to control the robot, based on the validation of the standard behavior tree being verified.

Figure 3:
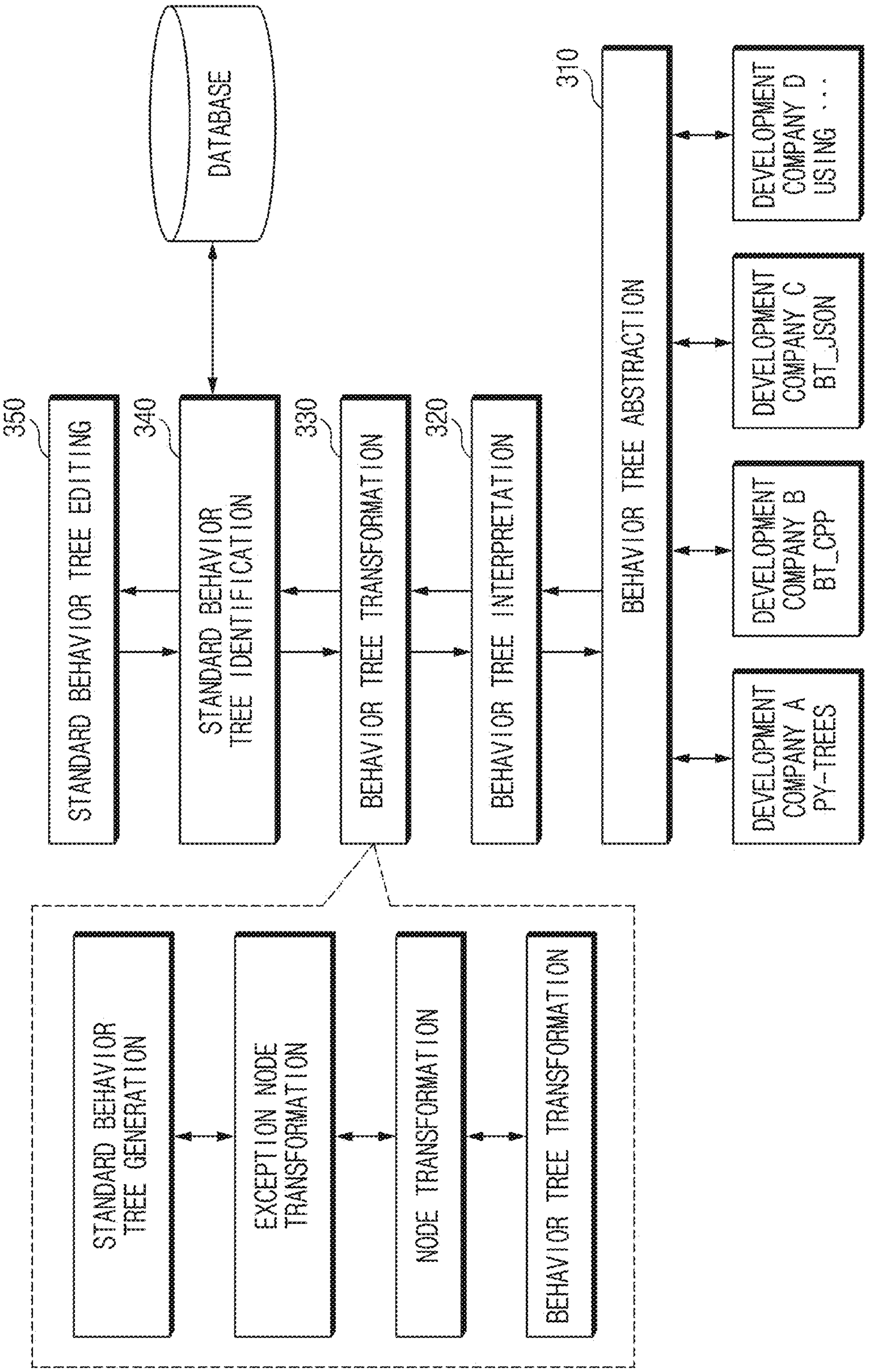
FIG. 3 is a drawing illustrating an example of an operation of generating a standard behavior tree, in a robot control apparatus according to an embodiment of the present disclosure.

FIG. 3 is a drawing illustrating an example of an operation of generating a standard behavior tree, in a robot control apparatus according to an embodiment of the present disclosure.

A processor (e.g., a processor 110 of FIG. 1) according to embodiment may perform a first operation 310 about behavior tree abstraction. For example, the first operation 310 may indicate an operation in which a behavior tree represented in various data formats and data structures used for each robotics development company (e.g., development companies A to D of FIG. 3) is input through an abstraction layer. The processor may perform the first operation 310 to identify the behavior tree and a behavior tree abstraction model.

The processor may perform a second operation 320 about behavior tree interpretation. For example, the second operation 320 may indicate an operation of interpreting contents of the behavior tree input through the abstraction layer. In detail, the processor may obtain a first parameter and a second parameter from the behavior tree abstraction model. The processor may interpret contents of the behavior tree, based on the first parameter and the second parameter. In other words, the operation of interpreting the contents of the behavior tree may be the same as an operation of identifying a type and an attribute of each of nodes included in the behavior tree.

The processor may obtain the first parameter about the type of each of the nodes included in the behavior tree and the second parameter included in the first parameter and about the attribute of each of the nodes included in the behavior tree, from the behavior tree abstraction model. The processor may apply the first parameter and the second parameter to the behavior tree to obtain a standard behavior tree. The processor may identify a root node included in the behavior tree, based on obtaining the first parameter and the second parameter. The processor may recursively search for the behavior tree on the basis of the root node to identify child nodes included in the behavior tree. The processor may apply the first parameter to at least one target node among the child nodes included in the behavior tree to obtain a type of the target node and may apply the second parameter to the target node to obtain an attribute of the target node.

The processor may perform a third operation 330 about behavior tree transformation. For example, the third operation 330 may indicate an operation of re-writing and/or transforming respective nodes included in the behavior tree interpreted based on the first parameter and the second parameter, depending on a target format. A detailed description of the third operation 330 will be given below with reference to FIG. 7.

The processor may combine the type of the target node and the attribute of the target node to generate a standard node, depending on the target format (e.g., an XML format). In other words, the standard node may indicate a node in which the type and the attribute of the target node are written in the target format. The processor may connect the standard node with the root node to obtain the standard behavior tree. In detail, the processor may apply the operation of transforming the target node into the standard node to all nodes included in the behavior tree.

The processor may identify a predetermined exception processing transformation model, based on not obtaining the type of the target node or not obtaining the attribute of the target node. The processor may obtain the type of the target node or the attribute of the target node, by use of the exception processing transformation model. The exception processing transformation model may include metadata based on an exception processing transformation rule defined by a user.

The processor may perform a fourth operation 340 about standard behavior tree identification. For example, the fourth operation 340 may indicate an operation of identifying the standard behavior tree obtained based on the first parameter and the second parameter. The processor may store a robot scenario paired with the standard behavior tree and the standard behavior tree in a memory and/or a database. A detailed description of a format in which it can be stored in the database will be given below with reference to FIG. 5.

The processor may perform a fifth operation 350 about standard behavior tree editing. For example, the fifth operation 350 may include an operation of loading the standard behavior tree stored in the database, displaying the loaded standard behavior tree on an interface, and allowing the user to edit the standard behavior tree by use of the interface.

When a robotics development company with a different development environment uses a behavior tree in a robot behavior scenario, the processor may share, edit, and generate the behavior tree through the abstraction process, by use of the first to fifth operations 310 to 350. Illustratively, the processor may transform a behavior tree developed by robotics development company A into a standard behavior tree and may store the standard behavior tree in the database. When robotics development company B is a development company that develops a robot in a development environment different from robotics development company A, it may develop the robot with reference to a standard behavior tree obtained and/or transformed from the behavior tree developed by robotics development company A in the database. Furthermore, when robot user C who purchases a robot uses a product of robotics development company A and when robot user C wants to change a robot behavior scenario to be suitable for the environment, he or she may generate a behavior tree more customized for the user environment, by use of an interface provided by the processor.

Figure 4:
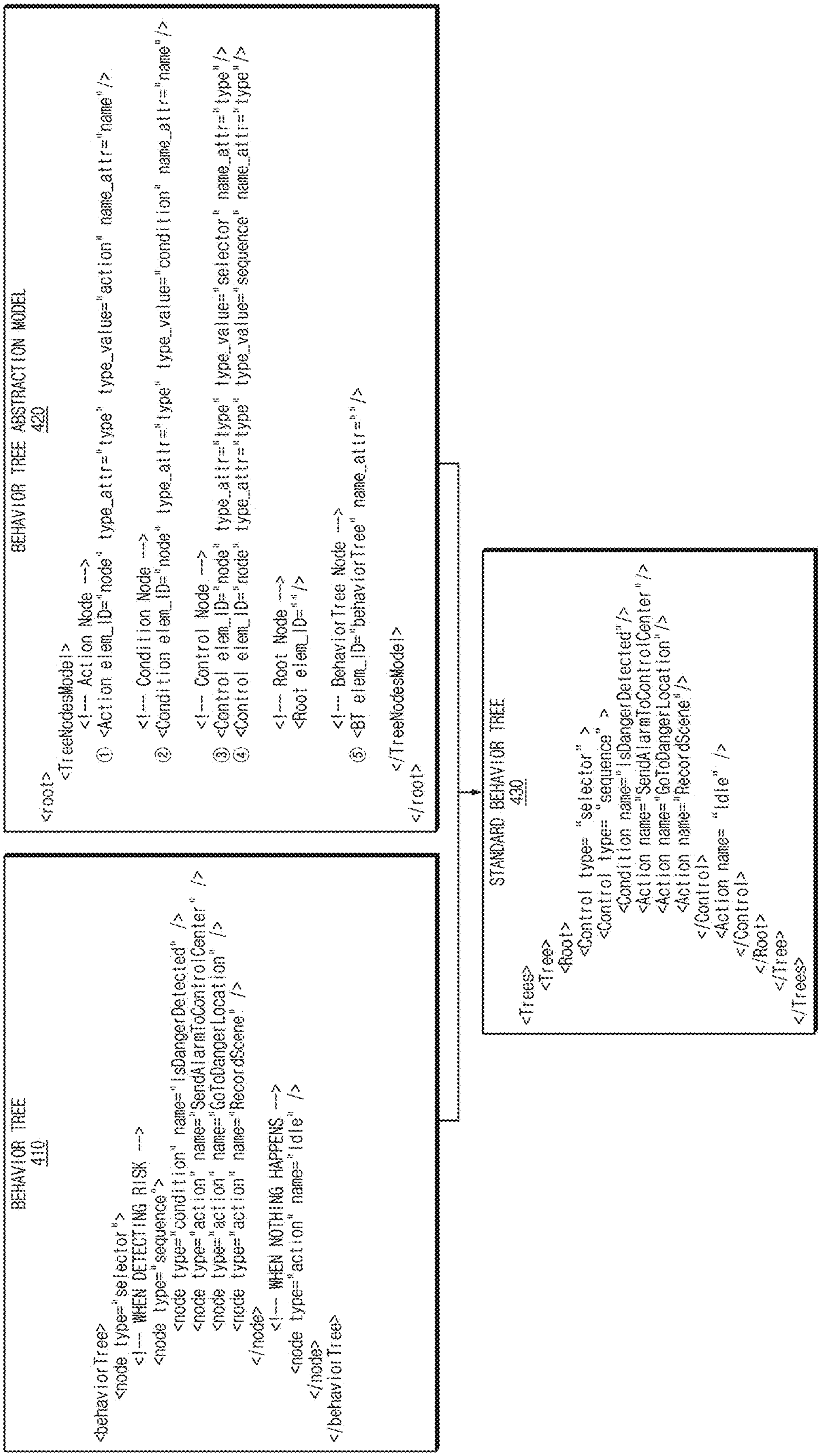
FIG. 4 illustrates an example of a behavior tree, a behavior tree abstraction model, and a standard behavior tree, according to an embodiment of the present disclosure.

FIG. 4 illustrates an example of a behavior tree, a behavior tree abstraction model, and a standard behavior tree, according to an embodiment of the present disclosure.

A processor (e.g., a processor 110 of FIG. 1) according to embodiment may obtain a standard behavior tree 430 satisfying a target format (e.g., an XML format), from a behavior tree 410, based on a behavior tree abstraction model 420.

The processor may obtain a first parameter and a second parameter from the behavior tree abstraction model 420. Illustratively, the behavior tree abstraction model 420 may include "elem_ID", "type_attr", "type_value", and "name_attr", for each node. The first parameter may include "type_attr". The second parameter may include "elem_ID", "type_value", and "name_attr".

Illustratively, the processor may identify a parameter about an action node among metadata included in the behavior tree abstraction model 420. In other words, the processor may perform interpretation of the action node included in the behavior tree 410, based on the parameter about the action node. After the interpretation of the action node is performed, the processor may re-write the action node depending on a target format to generate a standard node to be included in the standard behavior tree 430.

The processor may identify an attribute, "type", which is a "type_attr" value, of an element, "node", which is received with "elem_ID", to identify action nodes included in the behavior tree 430, using the same element as "action" which is a "type_value". Through such an operation, the processor may process data for each type of each of nodes included in the behavior tree 410 to perform interpretation of the behavior tree 410.

The processor may obtain the standard behavior tree 430 satisfying the target format, based on the behavior tree abstraction model 420 and the behavior tree 410.

FIG. 5 is a drawing illustrating an example of a database stored in a memory, in a robot control apparatus according to an embodiment of the present disclosure.

A processor (e.g., a processor 110 of FIG. 1) according to embodiment may store a standard behavior tree and a robot scenario in a database 500, as shown in FIG. 5 for example. The processor may load the stored standard behavior tree in response to a request of a user to provide an environment in which it can be possible to share a robot behavior scenario.

The database 500 may store a behavior tree depending on a behavior scenario type of a robot and may provide a data structure that is efficient to select a behavior tree suitable for a scenario desired by the user. Furthermore, the database 500 may provide a method for providing information about a list of unit function nodes constituting the behavior tree to allow a robotics development company to select a more suitable behavior tree.

Figure 6:
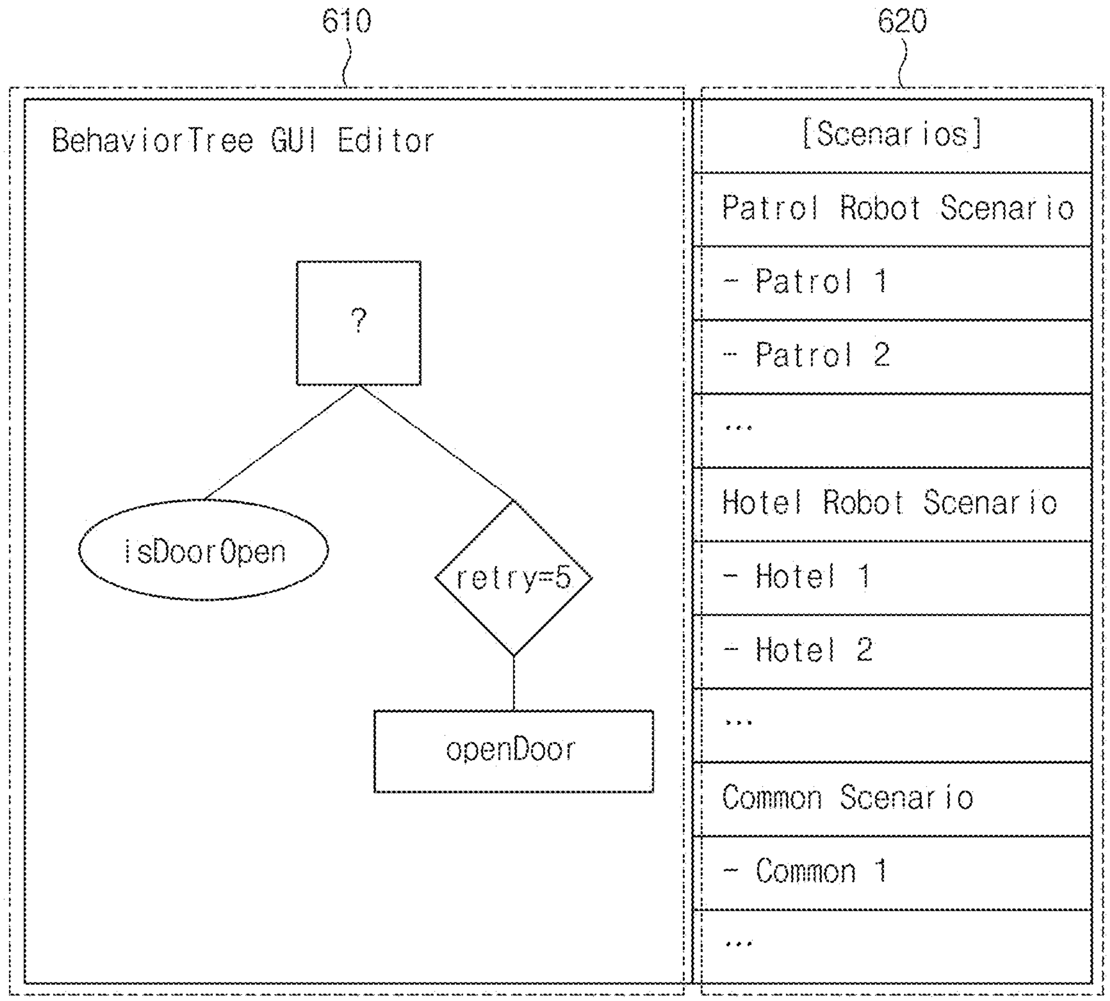
FIG. 6 is a drawing illustrating an example of an interface provided to a user, when executing a program including a code or instructions for performing an operation of FIG. 2, according to an embodiment of the present disclosure.

FIG. 6 is a drawing illustrating an example of an interface provided to a user, when executing a program including a code or instructions for performing an operation of FIG. 2, according to an embodiment of the present disclosure.

A processor (e.g., a processor 110 of FIG. 1) according to embodiment may provide the user with the program including the code or the instructions for performing the operation of FIG. 2. When executing the program, the user may identify an interface shown in FIG. 6. In other words, when the user executes the above-mentioned program, the processor may provide the user with the interface shown in FIG. 6, for example.

Referring to FIG. 6, a first interface 610 may provide an editing screen of a standard behavior tree. A second interface 620 may provide a list screen of the standard behavior tree for each robot scenario stored in a database.

The processor may load the standard behavior tree stored in a memory (e.g., a memory 120 of FIG. 1) or the database to provide the editing screen of the standard behavior tree on the first interface 610. The processor may display nodes included in the loaded standard behavior tree and an edge between the nodes included in the loaded standard behavior tree as a plurality of icons on an interface (e.g., the first interface 610) which can be the basis of the operation in which the user edits the standard behavior tree.

The processor may change the standard behavior tree, based on receiving an input (i.e., editing by the user) to each of a first icon about the node and a second icon about the edge among the plurality of icons. In other words, the user may correct the plurality of icons displayed on the first interface 610 to correct the standard behavior tree.

When the standard behavior tree is edited and/or corrected by the user, the processor may verify validation of the standard behavior tree. For example, the processor may identify a first node that is a root node among the nodes included in the standard behavior tree. The processor may identify second nodes, which are child nodes, among at least one node connected with the first node. The processor may verify validation of the first node, based on a type of the first node and the number of the second nodes. In detail, the processor may verify the validation of the first node, based on that the first node does not have a child node when the first node is an action node or that the first node should have only one child node when the first node is a decorator node.

The processor may recursively search for the standard behavior tree on the basis of the first node, thus verifying validation of each of the nodes included in the standard behavior tree. In other words, the processor may verify validation of the second node that is a child node of the first node, when the validation of the first node is verified, and may verify validation of a child node of the second node, when the validation of the second node is verified, thus verifying the validation of each of the nodes included in the standard behavior tree.

The second interface 620 may provide a standard behavior tree for each robot scenario stored in the database. The user may select an item included in the list displayed on the second interface 620 to edit the standard behavior tree.

The standard behavior tree in which the editing and/or the generation are/is completed on the first interface 610 and the second interface 620 may be inversely transformed to be used as a behavior scenario in a robotics development company (i.e., to apply the standard behavior tree to a robot to control the robot). Metadata included in a behavior tree abstraction model that is initially input may be referenced to perform inverse transformation.

Figure 7:
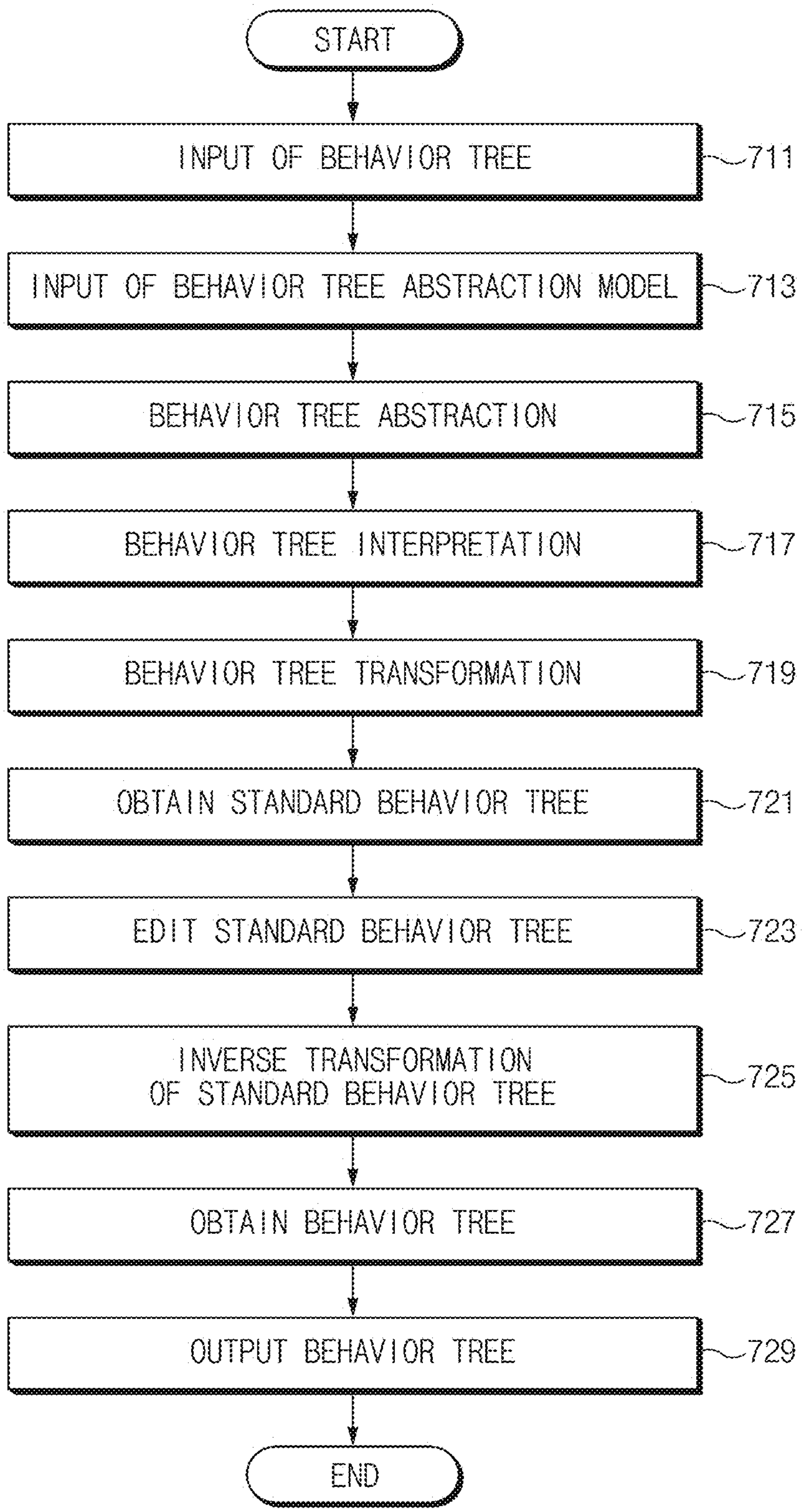
FIG. 7 is a flowchart for describing a method for obtaining a standard behavior tree, in a robot control apparatus according to an embodiment of the present disclosure.

FIG. 7 is a flowchart for describing a method for obtaining a standard behavior tree, in a robot control apparatus according to an embodiment of the present disclosure.

In operation 711, a processor (e.g., a processor 110 of FIG. 1) according to embodiment may identify an input of a behavior tree. In operation 713, the processor may identify an input of a behavior tree abstraction model. In operation 715, the processor may perform an operation (e.g., a first operation 310 of FIG. 3) about behavior tree abstraction. In operation 717, the processor may perform an operation (e.g., a second operation 320 of FIG. 3) about behavior tree interpretation.

In operation 719, the processor may perform an operation (e.g., a third operation 330 of FIG. 3) about behavior tree transformation. For example, when a plurality of behavior trees, rather than one behavior tree, are input, the processor may classify the behavior trees on the basis of a root node of the behavior trees. When the behavior tree is specified, the processor may transform nodes included in the behavior tree depending on a target format. The processor may recursively visit a child node, on the basis of the root node, and may perform transformation for each node type depending on a unit function for each node. The processor may apply an exception processing transformation rule (e.g., an exception processing transformation model) defined by a robotics development company or a user to process a node that is not interpreted.

In operation 721, the processor may recursively search for all behavior trees to complete transformation and may then generate a behavior tree in a standard behavior tree structure.

In operation 723, the processor may provide an environment for allowing/causing the user to edit the standard behavior tree, through an interface described in FIG. 6 for example. In other words, the processor may visualize the standard behavior tree, which is a standardized behavior tree, on the interface.

In operation 725, the processor may perform inverse transformation of the standard behavior tree. In other words, when the standard behavior tree is edited by the user, the processor may obtain an inverse transformation behavior tree from the edited standard behavior tree.

In operations 727 and 729, the processor may obtain the inverse transformation behavior tree and may output the obtained inverse transformation behavior tree. In other words, the processor may apply the inverse transformation behavior tree to a robot to control the robot. For reference, the format of the inverse transformation behavior tree may be a format different from a target format of the standard behavior tree, but may be the same format as a format of the behavior tree of operation 711, but not necessarily.

Figure 8:
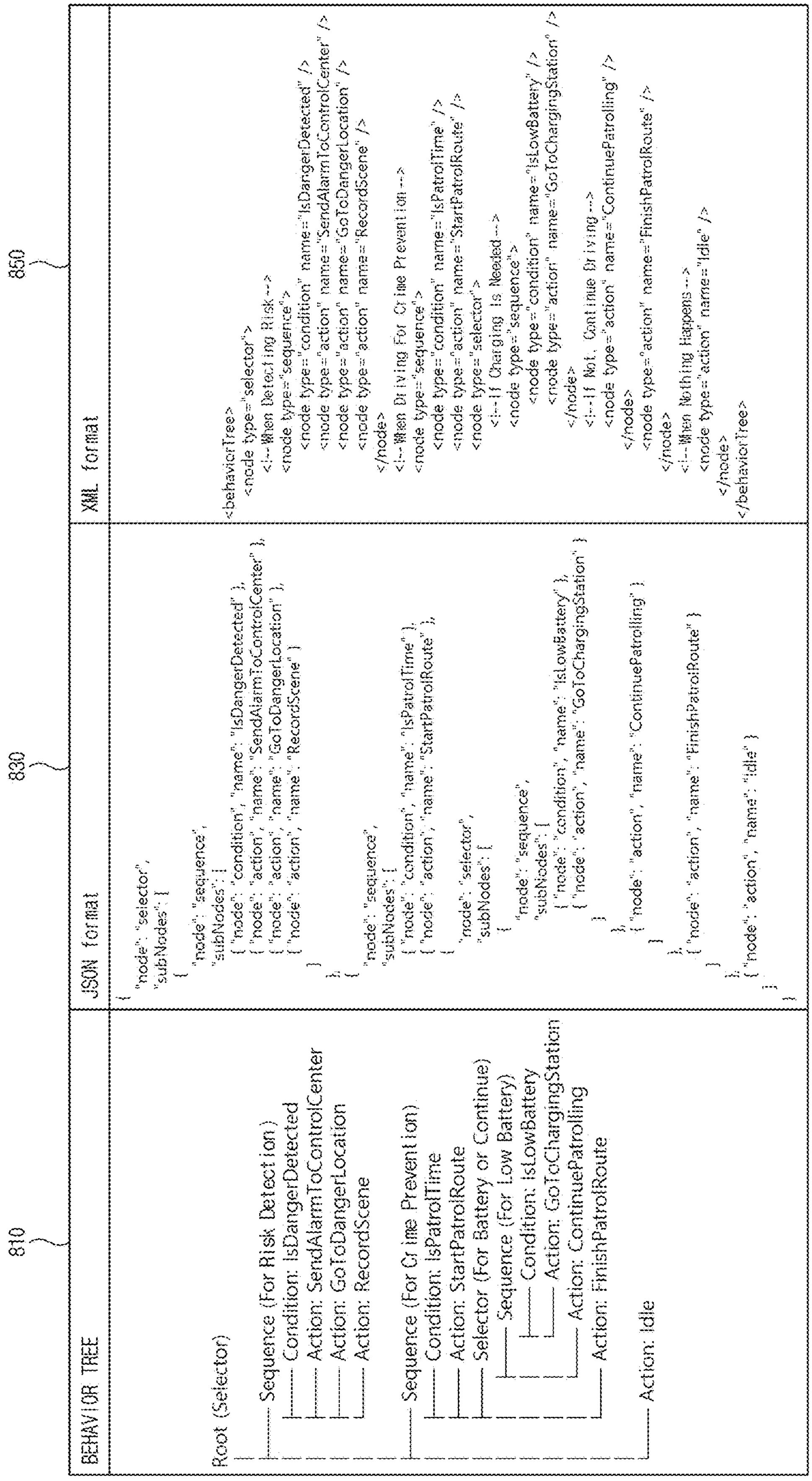
FIG. 8 illustrates an example of a behavior tree transformed according to a target format, according to an embodiment of the present disclosure.

FIG. 8 illustrates an example of a behavior tree transformed according to a target format.

FIG. 8 illustrates a behavior tree 810, a first standard behavior tree 830 changed to a JSON format, and a second standard behavior tree 850 changed to an XML format. When the target format is the JSON format, a processor (e.g., a processor 110 of FIG. 1) according to an embodiment may obtain the first standard behavior tree 830 from the behavior tree 810. On the other hand, when the target format is the XML format, the processor may obtain the second standard behavior tree 850 from the behavior tree 810.

Figure 9:
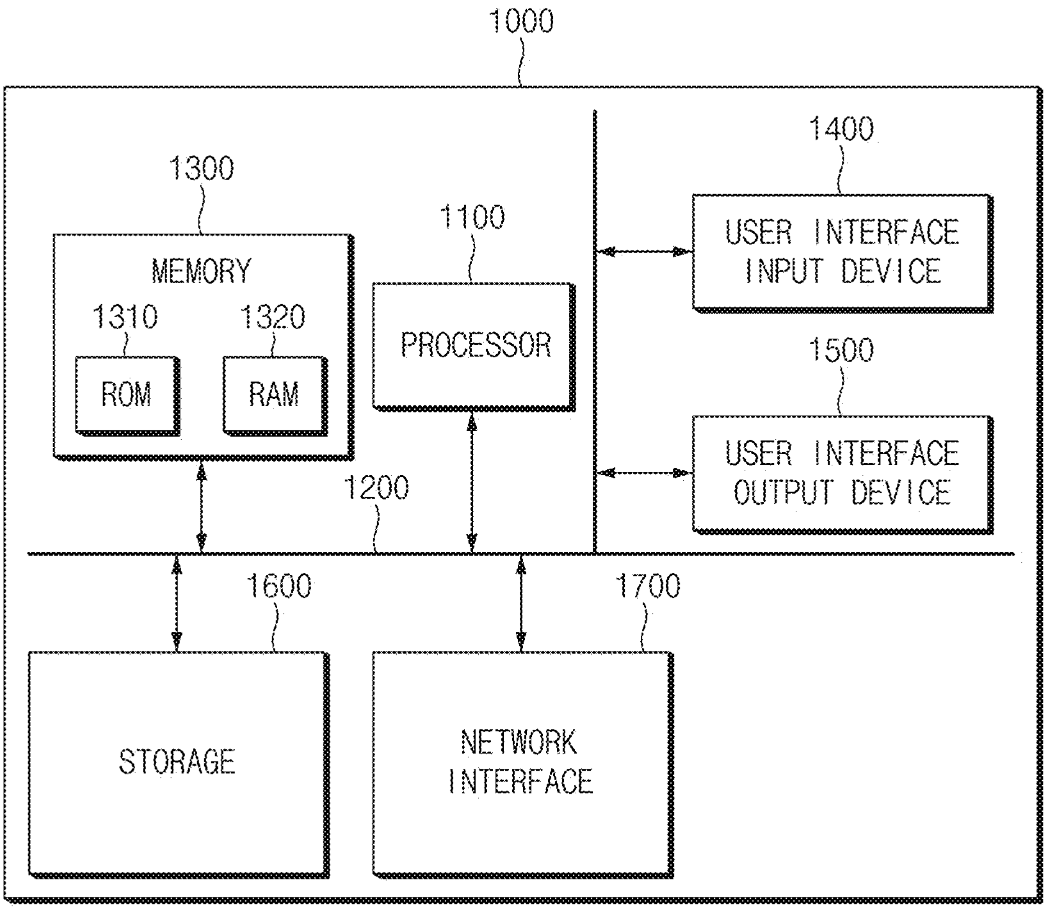
FIG. 9 is a drawing illustrating a computing system associated with a robot control apparatus or a robot control method according to an embodiment of the present disclosure.

FIG. 9 is a drawing illustrating a computing system associated with a robot control apparatus or a robot control method according to an embodiment of the present disclosure.

Referring to FIG. 9, a computing system 1000 about the robot control apparatus or the robot control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. A storage medium can include the memory 1300 and the storage 1600, which can include various types of volatile or non-volatile storage media. For example, the memory 1300 may include a ROM (Read Only Memory) 1310 and a RAM (Random Access Memory) 1320, for example.

Accordingly, the operations of the method or algorithm described in connection with the example embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to example embodiments and the accompanying drawings, the present disclosure is not necessarily limited thereto, and may be variously modified and altered by those skilled in the art to which the present disclosure pertains without departing from the spirit and scopes of the present disclosure claimed in the following claims.

The above-described example embodiments may be implemented with hardware components, software components, and/or a combination of hardware components and software components. For example, the devices, methods, and components described in the example embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It can be understood by those skilled in the art that although a single processing unit may be illustrated for convenience of understanding, the processing unit may include a plurality of processing elements and/or a plurality of types of processing elements (integrated and/or separated). For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions which may be executed through various computer hardware and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the example embodiments are described with reference to restricted drawings, the embodiments can be variously changed or modified based on the above description. For example, adequate effects may be achieved even if the foregoing processes and methods are carried out in different order than described above, and/or the aforementioned components, such as systems, structures, devices, or circuits, are concatenated or coupled in different forms and modes than as described above or be substituted or switched with other components or equivalents.

A description will be given of advantages of a robot control apparatus and a method thereof according to an embodiment of the present disclosure.

According to at least one of embodiments of the present disclosure, a robot control apparatus may transform and/or obtain an identified behavior tree into a standard behavior tree to control a robot, thus providing a robotics developer or a user with improvement of development efficiency.

According to at least one of embodiments of the present disclosure, a robot control apparatus may transform and/or obtain an identified behavior tree into a standard behavior tree to control a robot, thus improving reusability and compatibility of the behavior tree.

Various advantages ascertained directly or indirectly through an embodiment of the present disclosure may be provided.

Therefore, other implements, other embodiments, and equivalents to claims can be within scopes of the following claims.

Therefore, example embodiments of the present disclosure are not intended to necessarily limit the technical spirit of the present disclosure, and are provided for illustrative purposes. The scopes of the present disclosure can be construed on the basis of the accompanying claims, and technical ideas within the scopes equivalent to the claims can be included in the scopes of the present disclosure.

What is claimed is:

1. A robot control apparatus, comprising:

at least one processor; and a storage medium storing computer-readable instructions that, when executed by the at least one processor, cause the at least one processor to:

obtain a standard behavior tree satisfying a target format, from an inputted behavior tree, based on a behavior tree abstraction model applied to interpretation of the inputted behavior tree;

store a robot scenario paired with the standard behavior tree in the storage medium;

verify validation of the standard behavior tree, based on nodes included in the standard behavior tree and an edge between the nodes included in the standard behavior tree;

obtain an outputted behavior tree from the standard behavior tree, based on the behavior tree abstraction model; and control a robot based on the outputted behavior tree, wherein the instructions that cause the at least one processor to control the robot based on the outputted behavior tree further comprise instructions that cause the at least one processor to apply the outputted behavior tree to the robot to cause the robot to perform the robot scenario based on the validation of the standard behavior tree being verified.

2. The apparatus of claim 1, wherein the instructions further cause the at least one processor to:

obtain a first parameter about a type of each of the nodes included in the inputted behavior tree and a second parameter included in the first parameter and about an attribute of each of the nodes included in the inputted behavior tree, from the behavior tree abstraction model; and apply the first parameter and the second parameter to the inputted behavior tree to obtain the standard behavior tree.

3. The apparatus of claim 2, wherein the instructions further cause the at least one processor to:

identify a root node included in the inputted behavior tree, based on the obtaining of the first parameter and the second parameter;

recursively search for the inputted behavior tree based on the root node to identify child nodes included in the inputted behavior tree;

apply the first parameter to at least one target node among the child nodes included in the inputted behavior tree to obtain the type of the target node; and apply the second parameter to the target node to obtain the attribute of the target node.

4. The apparatus of claim 3, wherein the instructions further cause the at least one processor to:

combine the type of the target node and the attribute of the target node to generate a standard node, depending on the target format; and connect the standard node with the root node to obtain the standard behavior tree.

5. The apparatus of claim 3, wherein the instructions further cause the at least one processor to:

identify an exception processing transformation model, based on not obtaining the type of the target node or not obtaining the attribute of the target node; and obtain the type of the target node or the attribute of the target node, by use of the exception processing transformation model.

6. The apparatus of claim 1, wherein the instructions further cause the at least one processor to:

load the standard behavior tree stored in the storage medium;

display the nodes included in the loaded standard behavior tree and the edge between the nodes included in the loaded standard behavior tree as a plurality of icons on an interface;

enable a user to edit the standard behavior tree via the interface; and change the standard behavior tree, based on receiving an input to a first icon about the nodes and a second icon about the edge among the plurality of icons.

7. The apparatus of claim 1, wherein the outputted behavior tree has a different format than the standard behavior tree.

8. The apparatus of claim 1, wherein the instructions further cause the at least one processor to:

identify a first node being a root node among the nodes included in the standard behavior tree;

identify second nodes being child nodes among at least one node connected with the first node;

verify validation of the first node, based on a type of the first node and a number of the second nodes; and recursively search for the standard behavior tree based on the first node to verify validation of each of the nodes included in the standard behavior tree.

9. The apparatus of claim 1, wherein the instructions further cause the at least one processor to:

classify a plurality of inputted behavior trees based on a root node of each of the plurality of inputted behavior trees, and transform nodes of each inputted behavior tree depending on a target format.

10. A robot control method, comprising:

applying a behavior tree abstraction model to perform interpretation of an inputted behavior tree;

obtaining a standard behavior tree satisfying a target format, from the inputted behavior tree, based on the behavior tree abstraction model applied to perform interpretation of the inputted behavior tree;

storing a robot scenario paired with the standard behavior tree;

verifying validation of the standard behavior tree, based on nodes included in the standard behavior tree and an edge between the nodes included in the standard behavior tree;

obtaining an outputted behavior tree from the standard behavior tree, based on the behavior tree abstraction model; and controlling a robot based on the outputted behavior tree, wherein controlling the robot based on the outputted behavior tree comprises applying the outputted behavior tree to the robot to cause the robot to perform the robot scenario based on the validation of the standard behavior tree being verified.

11. The method of claim 10, wherein the obtaining of the standard behavior tree comprises:

obtaining a first parameter about a type of each of the nodes included in the inputted behavior tree and a second parameter included in the first parameter and about an attribute of each of the nodes included in the inputted behavior tree, from the behavior tree abstraction model; and applying the first parameter and the second parameter to the inputted behavior tree to obtain the standard behavior tree.

12. The method of claim 11, wherein the obtaining of the standard behavior tree comprises:

identifying a root node included in the inputted behavior tree, based on the obtaining of the first parameter and the second parameter;

recursively searching for the inputted behavior tree based on the root node to identify child nodes included in the inputted behavior tree;

applying the first parameter to at least one target node among the child nodes included in the inputted behavior tree to obtain the type of the target node; and applying the second parameter to the target node to obtain the attribute of the target node.

13. The method of claim 12, wherein the obtaining of the standard behavior tree comprises:

combining the type of the target node and the attribute of the target node to generate a standard node, depending on the target format; and connecting the standard node with the root node to obtain the standard behavior tree.

14. The method of claim 12, wherein the obtaining of the standard behavior tree comprises:

identifying an exception processing transformation model, based on not obtaining the type of the target node or not obtaining the attribute of the target node; and obtaining the type of the target node or the attribute of the target node, by use of the exception processing transformation model.

15. The method of claim 10, further comprises:

loading the standard behavior tree stored in a storage medium;

displaying the nodes included in the loaded standard behavior tree and the edge between the nodes included in the loaded standard behavior tree as a plurality of icons on an interface;

enabling a user to edit the standard behavior tree via the interface; and changing the standard behavior tree, based on receiving an input to a first icon about the node and a second icon about the edge among the plurality of icons.

16. The method of claim 10, wherein the outputted behavior tree has a different format than the standard behavior tree.

17. The method of claim 10, wherein the verifying of the validation of the standard behavior tree comprises:

identifying a first node being a root node among the nodes included in the standard behavior tree;

identifying second nodes being child nodes among at least one node connected with the first node;

verifying validation of the first node, based on a type of the first node and a number of the second nodes; and recursively searching for the standard behavior tree based on the first node to verify validation of each of the nodes included in the standard behavior tree.

18. The method of claim 10, further comprising:

classifying a plurality of inputted behavior trees based on a root node of each of the plurality of inputted behavior trees, and transforming nodes of each inputted behavior tree depending on the target format.

19. A robot control method, comprising:

applying a behavior tree abstraction model to interpret an inputted behavior tree;

obtaining a standard behavior tree satisfying a target format, from the inputted behavior tree, based on the applying of the behavior tree abstraction model applied to interpret the inputted behavior tree;

verifying validation of the standard behavior tree, based on nodes included in the standard behavior tree and an edge between the nodes included in the standard behavior tree;

displaying the nodes included in the standard behavior tree and the edge between the nodes included in the standard behavior tree as representative icons on a user interface;

enabling a user to edit the standard behavior tree via the user interface using the representative icons; and changing and storing the standard behavior tree, based on receiving at least one input from the user via the user interface, wherein the at least one input includes a first user revision to a first icon of the representative icons about the node, a second user revision to a second icon of the representative icons about the edge, or any combination thereof.

20. The method of claim 19, further comprises obtaining and outputting an outputted behavior tree from the standard behavior tree based on the behavior tree abstraction model, wherein the outputted behavior tree has a different format than the standard behavior tree and the inputted behavior tree.

* * * * *